United States Patent
Mahlein et al.

[11] 4,006,964
[45] Feb. 8, 1977

[54] INTEGRATED OPTICAL WAVEGUIDE HAVING A FILTER

[75] Inventors: Hans Mahlein; Gerhard Winzer, both of Munich, Germany

[73] Assignee: Siemens Aktiengesellschaft, Berlin & Munich, Germany

[22] Filed: Aug. 15, 1975

[21] Appl. No.: 605,182

[30] Foreign Application Priority Data
Sept. 6, 1974  Germany ............... 2442724

[52] U.S. Cl. ............ 350/96 C; 350/96 WG; 350/152; 350/155
[51] Int. Cl.² ............ G02b 5/14; G02B 5/30
[58] Field of Search ........ 350/96 C, 96 WG, 152, 350/155

[56] References Cited
UNITED STATES PATENTS
3,905,676  9/1975  Ulrich ............... 350/96 WG FOREIGN PATENTS OR APPLICATIONS
1,126,392  2/1968  United Kingdom ........ 350/152

Primary Examiner—John K. Corbin
Assistant Examiner—Stewart Levy
Attorney, Agent, or Firm—Hill, Gross, Simpson, Van Santen, Steadman, Chiara & Simpson

[57] ABSTRACT

An integrated optical waveguide has a first waveguide portion with a tapered terminus which directs the light carried therein into a multiple, high-and low-refractive layered filter system for spectrum or polarization filtration. A second optical waveguide portion has a tapered origin spaced closely adjacent the tapered terminus of the first portion on the topmost filter layer to pick up and transmit light from the filter. Effective indices of refraction of the integrated waveguides are greater than the index of refraction of the adjoining topmost layer of the filter for wave lengths of desired light.

5 Claims, 1 Drawing Figure

U.S. Patent   Feb. 8, 1977   4,006,964
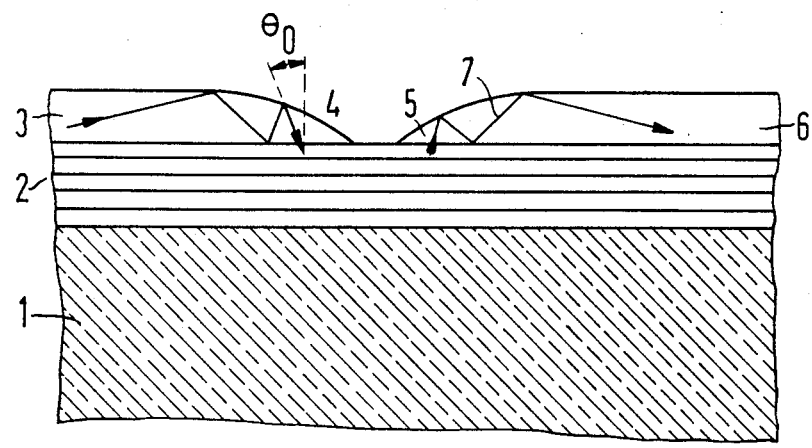

INTEGRATED OPTICAL WAVEGUIDE HAVING A FILTER

BACKGROUND OF THE INVENTION

1. Field of the Invention

The invention relates to an integrated optical waveguide having a filter.

2. The Prior Art

Essays by S. E. Miller (IEEE J. Quantum Electronics, QE-8 p. 199 (1972)) and P. K. Tien (Applied Optics, vol. 10 p. 2395 (1975)) describe wave-guide structures having integrated modulators, laser amplifiers, and coupling systems.

The design and properties of multilayer filters are described for instance in the book *Thin Film Optical Filters* by H. A. Macleod, Adam Hilger, Ltd, (London, 1969). The theory described therein permits construction of dielectric and metallic thin films which change the spectrum or polarization properties of optical radiation or serve as reflectors.

The German Offenlegungschrift No. 2,252,826 shows a specific design of a filter with a number of high- and low-refractive layers, and provides indices of refraction and angles of incidence of lightwaves into the first layer of the multiple-layer system adjacent the waveguides which are useful with the present invention.

SUMMARY OF THE INVENTION

It is the primary object of the present invention to provide a waveguide with a polarization-selective or spectrum-selective filter for optical communications applications. In accordance with the principles of the invention, a multilayer filter system with high-refractive and low-refractive layers is arranged upon a substrate. Upon a first or topmost layer are arranged a first and a second waveguide, each having a tapered end closely adjacent the other guide. The effective index of refraction of the two waveguides, for the light to be transmitted, is greater than the index of refraction $n_1$ of the first layer of the multilayer system adjacent the waveguides. Because of the tapered shape of the two waveguide ends, a light wave supplied via the first waveguide is refracted into the multilayer system. Within the multilayer system the light is reflected and transmitted at the individual layer boundaries and interference occurs. A filtered light wave is refracted into the second waveguide and transmitted further. The multilayer system is particularly effective as a spectrum-selective or as a polarization filter if it has a design according to the German Offenlegungschrift No. 2,252,826.

DESCRIPTION OF THE DRAWING

The single figure is a longitudinal sectional view through the junction of the first and second waveguides, the multilayer system and the substrate of the present invention.

DESCRIPTION OF THE PREFERRED EMBODIMENT

The multilayer system 2 is applied onto a glass substrate 1 whereby the system 2 has an index of refraction structure to be effective as a reflection polarizer for monochromatic lightwaves which enter into a first or topmost layer of the multiple layer system 2 opposite the substrate 1 with an angle $\theta_o$ from an adjacent first waveguide portion 3 having a tapered end 4. As disclosed in the German Offenlegungschrift No. 2,252,826, all of the alternating, high-refractive and low-refractive layers of the multilayer system 2 have an identical effective optical thickness which is equal to an odd multiple of ¼ of a wave length of the light carried by the waveguide portion 3. The multilayer system comprises an index of refraction structure $n_S\,(n_2,\,n_1)^k n_o$ where $n_S$ = index of refraction of the substrate 1, $n_o$ = index of refraction of the waveguides and the structure fulfills the relation:

$$k = 1/2 \frac{\ln(n_s^2 - n_o^2 \sin^2\theta_0) - \ln(n_o^2 - n_o^2 \sin^2\theta_0)}{\ln(n_s^2 - n_o^2 \sin^2\theta_0) - \ln(n_1^2 - n_o^2 \sin^2\theta_0)},$$

whereby $n_1$ and $n_2$ are the indices of refraction of the first and second layers of the multilayer system which are adjacent the waveguide, and $k = 1, 2, \ldots$.

Since the tapered shape of the waveguide 4 is determined by the required angle $\theta_o$ from the above relation, the lightwave enters into the multilayer system 2 at an angle $\theta_o$. To avoid loss of light reflected in the multilayer system, a second waveguide 6 has a tapered end 5 arranged closely adjacent the tapered end 4 of the first waveguide 3. Polarized or filtered lightwaves will reach the waveguide 6 from the multilayer system 2 along a path 7 as shown in the drawing, and are transmitted further within the waveguide 6.

Although various minor modifications might be suggested by those versed in the art, it should be understood that we wish to embody within the scope of the patent warranted hereon all such modifications as reasonably and properly come within the scope of our contribution to the art.

We claim as our invention:

1. An integrated optical waveguide with a filter, characterized in that a multilayer filter system having alternating high-refractive and low-refractive layers applied onto a substrate has arranged upon a first layer thereof opposite the substrate first and second waveguide portions having closely spaced, adjacent tapered ends, the effective indices of refraction for light in the two waveguides being greater than the index of refraction of said first layer of the filter.

2. A waveguide as defined in claim 1, wherein the multilayer system is a spectrum filter.

3. A waveguide as defined in claim 1, characterized in that the multilayer system is a polarization filter.

4. An integrated optical wave guide with a filter as defined in claim 1, wherein said substrate is glass and said multilayer filter system comprises an index of refraction structure $n_S\,(n_2,\,n_1)^K n_o$, wherein $n_S$ = index of refraction of the substrate 1, $n_o$ = index of refraction of the waveguides, and the structure fulfills the relation:

$$k = 1/2 \frac{\ln(n_s^2 - n_o^2 \sin^2\theta_0) - \ln(n_o^2 - n_o^2 \sin^2\theta_0)}{\ln(n_s^2 - n_o^2 \sin^2\theta_0) - \ln(n_1^2 - n_o^2 \sin^2\theta_0)},$$

wherein $n_1$ and $n_2$ are the indices of refraction of said first and second layers of the multilayer system which are adjacent the waveguide, and $K = 1, 2, \ldots$ 5. An integrated optical waveguide with a multilayer filter, wherein a first portion of said waveguide terminates in a tapered end affixed laterally to said filter at a topmost layer thereof, the said topmost layer of said filter having an index of refraction $n_1$ which is less than the effective index of refraction of said first waveguide portion, and the tapered end reflecting light into the filter at an angle; and a second portion of said waveguide originates in a tapered beginning affixed laterally to said topmost layer of said filter closely longitudinally adjacent said tapered end of said first portion, thereby to pick up and transmit filtered light from said filter and said first portion of said waveguide.

* * * * *